(12) United States Patent
Yu et al.

(10) Patent No.: US 12,637,375 B2
(45) Date of Patent: May 26, 2026

(54) PROCESSING METHOD FOR GRAPHITE ACID PURIFICATION WASTEWATER

(71) Applicants: GRAPHEX TECHNOLOGIES LLC., Royal Oak, MI (US); WUHAN UNIVERSITY OF TECHNOLOGY, Wuhan (CN); GRAPHEX GROUP LIMITED, Hong Kong (CN)

(72) Inventors: Frank Yu, Hong Kong (CN); Liqun Luo, Hong Kong (CN); Bin Qiu, Hong Kong (CN); Ting Jia, Hong Kong (CN); Xiaoxue Zhang, Hong Kong (CN)

(73) Assignee: GRAPHEX GROUP LIMITED, Hong Kong (CN)

( * ) Notice: Subject to any disclaimer, the term of this patent is extended or adjusted under 35 U.S.C. 154(b) by 413 days.

(21) Appl. No.: 18/346,262

(22) Filed: Jul. 2, 2023

(65) Prior Publication Data

US 2024/0158274 A1     May 16, 2024

(30) Foreign Application Priority Data

Nov. 10, 2022     (CN) .......................... 202211404435.3

(51) Int. Cl.
*C02F 9/00* (2023.01)
*C02F 1/00* (2023.01)
(Continued)

(52) U.S. Cl.
CPC ................ *C02F 9/00* (2013.01); *F01D 15/10* (2013.01); *C02F 2001/007* (2013.01);
(Continued)

(58) Field of Classification Search
CPC ...... C02F 9/00; C02F 1/66; C02F 1/52; C02F 1/14; C02F 1/16; C02F 2001/5218;
(Continued)

(56) References Cited

FOREIGN PATENT DOCUMENTS

| | | | | | |
|---|---|---|---|---|---|
| CN | 207468389 U | * | 6/2018 | | |
| CN | 209042315 U | * | 6/2019 | | |
| WO | WO-2021097539 A1 | * | 5/2021 | ........... | C01B 32/215 |

OTHER PUBLICATIONS

Lin et al., English machine translation CN 209042315, pp. 1-3 (Year: 2019).*

(Continued)

*Primary Examiner* — Claire A Norris

(57) ABSTRACT

The application discloses a processing method for graphite acid purification wastewater which comprises processing steps of neutralization and precipitation preprocessing, supernatant electrically distilling and vaporizing, electric energy recycling, condensate recycling and vaporization residue regularly discharging. The processing method performs neutralization and precipitation preprocessing to obtain neutralized supernatant, pumps the supernatant into an electric distiller to be vaporized and obtain electric energy for recycling through steam turbine, and acquires vaporization condensate by residual heat exchange. The vaporization condensate reaches the standard of graphite acid purification impurities such as fluorine, chlorine, aluminum, silicon, iron, magnesium, copper, and zinc and the wastewater discharge standard. The steam heat energy can be recycled and transformed into electric energy to save processing cost. Meanwhile, the vaporization condensate can also be used in the graphite purification process to save water resources, which is not only environmentally friendly and efficient, but also intensively economical.

8 Claims, 1 Drawing Sheet

(51) Int. Cl.

| | |
|---|---|
| *C02F 1/14* | (2023.01) |
| *C02F 1/52* | (2023.01) |
| *C02F 1/66* | (2023.01) |
| *F01D 15/10* | (2006.01) |
| *C02F 101/14* | (2006.01) |
| *C02F 101/20* | (2006.01) |

(52) U.S. Cl.
CPC .............. *C02F 1/14* (2013.01); *C02F 1/5236* (2013.01); *C02F 1/66* (2013.01); *C02F 2101/14* (2013.01); *C02F 2101/203* (2013.01); *C02F 2201/009* (2013.01); *C02F 2303/10* (2013.01); *F05D 2220/76* (2013.01)

(58) Field of Classification Search
CPC ................ C02F 1/5236; C02F 2101/14; C02F 2101/203; C02F 2201/009; C02F 2303/10; F01D 15/10
USPC ........................................................ 210/702
See application file for complete search history.

(56) References Cited

OTHER PUBLICATIONS

Cai et al., English machine translation, CN 207468389, pp. 1-5 (Year: 2018).*

* cited by examiner

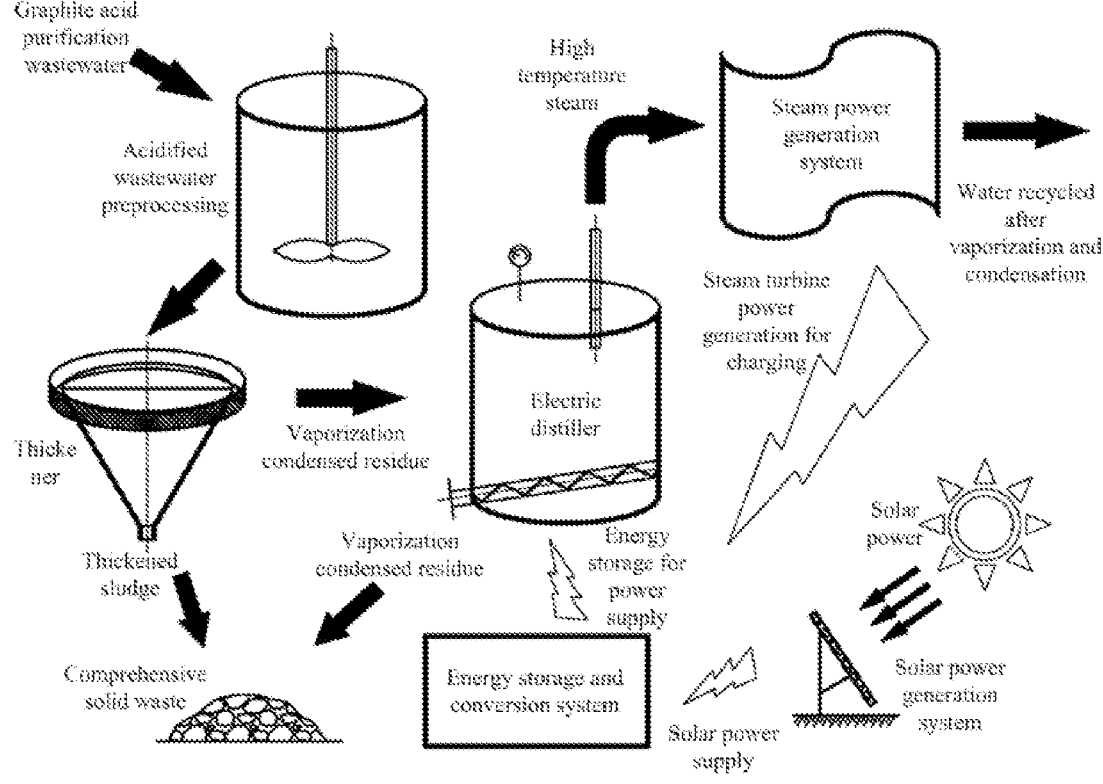

PROCESSING METHOD FOR GRAPHITE ACID PURIFICATION WASTEWATER

TECHNICAL FIELD

The application relates to the technical field of water processing of environmental engineering, and in particular, relates to a processing method for graphite acid purification wastewater.

BACKGROUND

Graphite is an important nonmetallic mineral resource, and due to special structure of the graphite material, natural graphite has a wide range of applications; however, the application performance of natural graphite is closely related to the purity thereof, and thus it is necessary to refine and purify the natural graphite during use. Although graphite refinement methods mainly include flotation method, alkali-acid method, hydrofluoric acid method, chlorination roasting method and high temperature method and many other methods, different methods are selected depending on different graphite purities, application requirements or refinement costs.

In the refinement and purification of natural graphite, natural graphite often contains a small amount of impurity minerals, such as quartz, mica, hematite and silicate or other associated minerals, so that a small amount of silicon, aluminum, iron, potassium, calcium, sodium, magnesium and other elements and compounds remain in high-carbon natural graphite, and thus it is necessary to perform purification processing on the graphite.

At present, a large amount of acidic wastewater is often produced in the production process for refinement of graphite, and the wastewater also contains a small amount of elements such as fluorine, silicon, aluminum, iron, calcium, potassium and sodium, and some acidic wastewater even contains some heavy metal ions and acid group ions, such as $Zn^{2+}$, $Pb^{2+}$, $Mn^{2+}$, $Cu^{2+}$, $Ni^{2+}$, $Cl^-$ and $SO_4^{2-}$. If these wastewaters are directly discharged, they will pose a serious threat to human health and the sustainable development of the whole society and certainly cause great damage to the surrounding ecological environment, and such a practice does not meet the requirements of the national environmental protection policy. At the same time, in the process of graphite purification, water consumption is great, so it is necessary to recycle some of the water in the process of graphite purification to reduce the consumption of fresh water. The defluorinated water recycled sometimes contains other metal ions or acid group ions, which is unfavorable for the reuse of the recycled water. Therefore, it is of great practical and strategic significance to strengthen the processing of wastewater after graphite purification, develop the processing and reuse technology of wastewater after graphite purification, and save water resources.

At present, there are some methods and devices for graphite wastewater processing in the prior art, such as those disclosed in Chinese patent application No. 201510918707.5 and No. 202022717829.7, but most of them only aim at the processing and removal of fluoride ions in wastewater; at the same time, some of them use defluorination reagents, such as aluminum sulfate, aluminum chloride, activated alumina, activated magnesia, bone charcoal, zeolite, zirconia and other substances so that other impurities are introduced into this kind of wastewater, which is unfavorable for the reuse of wastewater after processing, affects the utilization efficiency of the water recycled and increases the consumption of fresh water.

SUMMARY

Aiming at the above technical problems, the present utility model puts forward a processing method for graphite acid purification wastewater, which can effectively remove heavy metal ions and acid group ions in graphite acid purification wastewater, and can reuse water resources and further reuse steam heat energy in the processing process; therefore, the processing method not only solves the wastewater processing problem, but also reduces the energy consumption for wastewater processing, which is not only environmentally friendly and efficient but also intensively economical.

A processing method for graphite acid purification wastewater is provided, which includes the following specific processing steps.

Step 1 of preprocessing of neutralization and precipitation includes: adding alkaline neutralizer into the graphite acid purification wastewater to neutralize the pH value of the purification wastewater to 6~10, obtaining a neutralized sediment and a neutralized supernatant through concentration and sedimentation.

Step 2 of electrically distilling and vaporizing the supernatant includes: pumping the neutralized supernatant after neutralization preprocessing, concentration and sedimentation of Step 1 into an electric distiller to be heated and vaporized to obtain a vaporized supernatant and a vaporization residue.

Step 3 of recycling of the electric energy includes: introducing the vaporized supernatant into a power generation system of the steam turbine to generate electricity at first, condensing and collecting the vaporized supernatant which has been driven the steam turbine to generate power by a heat exchanger, to obtain vaporization condensate, and using the electric energy generated by the power generation system of the steam turbine as energy source for electric distillation, heating, and vaporization through circulation of said electric energy.

Step 4 of recycling of the condensate includes: using the condensate after vaporization as water used in the graphite purification process through fluid circulation.

Step 5 of regularly discharging the vaporization residue includes: regularly discharging the vaporization residue by a residue discharging device of the electric distiller, wherein the vaporization residue are formed by crystallization or precipitation and concentration of some ions in the neutralized supernatant after the neutralized supernatant is vaporized and concentrated.

In the above technical solution, preferably, the electric distiller is connected with an external solar power generation system which serves as the supplement for the electric energy recycled in the step 3.

In the above technical solution, preferably, in the step 1, one or more of calcium carbonate, quicklime, lime and/or lime slurry is used as the alkaline neutralizer.

In the above technical solution, preferably, in the step 1, the method for concentration and sedimentation is selected from natural sedimentation, high-efficiency thickener sedimentation or centrifugal sedimentation.

In the above technical solution, preferably, in the step 2, the exhaust pressure of the electric distiller for heating and vaporization is 0.6 MPa to 3.5 MPa, the vaporized steam passes through the power generation system of the steam turbine, and the exhaust pressure of the steam turbine is 0.11 MPa to 0.55 MPa.

In the above technical solution, preferably, in the step 3, the electric energy generated by the power generation system of the steam turbine firstly charges an energy storage and conversion system for later use.

In the above technical solution, preferably, in the step 4, the content of graphite acid purification impurities in the condensate is reduced to 0.1 mg/L to 5 mg/L, and the condensate is directly discharged to the outside; wherein the graphite acid purification impurities includes fluorine, chlorine, aluminum, silicon, iron, and magnesium.

In the above technical solution, preferably, in the step 5, the vaporization residue is periodically discharged at intervals between 1 and 6 hours, and for a period between 1 to 10 minutes at each interval.

The beneficial effects of the application are as follows.

The processing method for graphite acid purification wastewater of the application performs preprocessing of neutralization and precipitation to obtain neutralized supernatant through concentration and sedimentation, and pumps the supernatant into an electric distiller to acquire vaporization condensate, the content of graphite acid purification impurities such as fluorine, aluminum, copper and zinc in the vaporization condensate reaches the standard, the vaporization condensate reaches the wastewater discharge standard, and the steam heat energy can be recycled and transformed into electric energy of the steam turbine. At the same time, the vaporization condensate can also be used as water used in the graphite purification process to save water resources, which is not only environmentally friendly and efficient, but also intensively economical.

BRIEF DESCRIPTION OF THE DRAWINGS

FIG. 1 is a schematic diagram of a processing method of the application.

DETAILED DESCRIPTION

The technical solution of the application will be clearly and completely described hereinafter with reference to attached drawings of the application. Based on embodiments of the application, all other embodiments obtained by those of ordinary skill in the art without creative labor shall belong to the scope claimed in the application.

A processing method for graphite acid purification wastewater is shown in FIG. 1, which includes the following specific processing steps:

Step 1 of preprocessing of neutralization and precipitation including: adding alkaline neutralizer into the graphite acid purification wastewater to neutralize the pH value of the purification wastewater to 6~10, obtaining a neutralized sediment and a neutralized supernatant through concentration and sedimentation;

step 2 of electrically distilling and vaporizing the supernatant including: pumping the neutralized supernatant after neutralization preprocessing, concentration and sedimentation of Step 1 into an electric distiller to be heated and vaporized to obtain a vaporized supernatant and a vaporization residue;

step 3 of recycling of the electric energy, including: introducing the vaporized supernatant into a power generation system of the steam turbine to generate electricity at first, condensing and collecting the vaporized supernatant which has been driven the steam turbine to generate power by a heat exchanger, to obtain vaporization condensate, and using the electric energy generated by the power generation system of the steam turbine as energy source for electric distillation, heating, and vaporization through circulation of said electric energy;

step 4 of recycling of the condensate, including: using the condensate after vaporization as water used in the graphite purification process through fluid circulation;

step 5 of regularly discharging the vaporization residue, including: regularly discharging the vaporization residue by a residue discharging device of the electric distiller, wherein the vaporization residue are formed by crystallization or precipitation and concentration of some ions in the neutralized supernatant after the neutralized supernatant is vaporized and concentrated.

In this embodiment, the electric distiller is connected with an external solar power generation system which serves as the supplement for the electric energy recycled in the step 3.

In this embodiment, in the step 1, one or more of calcium carbonate, quicklime, lime and/or lime slurry is used as the alkaline neutralizer.

In this embodiment, in the step 1, the method for concentration and sedimentation is selected from natural sedimentation, high-efficiency thickener sedimentation or centrifugal sedimentation.

In this embodiment, in the step 2, the exhaust pressure of the electric distiller for heating and vaporization is 0.6 MPa to 3.5 MPa, the vaporized steam passes through the power generation system of the steam turbine, and the exhaust pressure of the steam turbine is 0.11 MPa to 0.55 MPa.

In this embodiment, in the step 3, the electric energy generated by the power generation system of the steam turbine may first charge an energy storage and conversion system for later use.

In this embodiment, in the step 4, the content of graphite acid purification impurities such as fluorine, chlorine, aluminum, silicon, iron, magnesium, copper and zinc in the condensate may be reduced to 0.1 mg/L to 5 mg/L, and the condensate may also be directly discharged to the outside.

In this embodiment, in the step 5, the vaporization residue is periodically discharged at intervals between 1 and 6 hours, and for a period between 1 to 10 minutes at each interval.

As shown in FIG. 1, in this embodiment, the graphite acid purification wastewater is neutralized and precipitated in a thickener, and the thickened sludge obtained after precipitation is converted into comprehensive solid waste for processing. The processing method for graphite acid purification wastewater of the application performs preprocessing of neutralization and precipitation to obtain neutralized supernatant through concentration and sedimentation, pumps the supernatant into an electric distiller to acquire vaporization condensate, the content of graphite acid purification impurities such as fluorine, chlorine, aluminum, silicon, iron, magnesium, copper and zinc in the vaporization condensate reaches the standard, the vaporization condensate reaches the wastewater discharge standard, and the steam heat energy can be recycled and transformed into electric energy of the steam turbine. At the same time, the vaporization condensate can also be used as water used in the graphite purification process to save water resources, which is not only environmentally friendly and efficient, but also intensively economical.

What described above are only preferred embodiments of the application, and are not intended to limit the application; and various modifications and variations of the application can be made by those skilled in the art. Any modification, equivalent substitution, improvement or the like made within the spirit and principle of the application shall be included in the scope claimed in the application.

What is claimed is:

1. A processing method for graphite acid purification wastewater, wherein the method comprises specific processing steps as follows:

step 1 of preprocessing of neutralization and precipitation, comprising:

obtaining a neutralized graphite acid purification wastewater through adding alkaline neutralizer into the graphite acid purification wastewater to neutralize the pH value of the purification wastewater to 6~10, and obtaining a neutralized sediment and a neutralized supernatant from the neutralized graphite acid purification wastewater through concentration and sedimentation;

step 2 of electrically distilling and vaporizing the supernatant, comprising:

pumping the neutralized supernatant after neutralization preprocessing, concentration and sedimentation of step 1 into an electric distiller to be heated and vaporized to obtain a vaporized supernatant and a vaporization residue;

step 3 of recycling of the electric energy, comprising:

introducing the vaporized supernatant into a power generation system of the steam turbine to generate electricity at first, condensing and collecting the vaporized supernatant which has been driven the steam turbine to generate power by a heat exchanger, to obtain vaporization condensate, and using the electric energy generated by the power generation system of the steam turbine as energy source for electric distillation, heating, and vaporization through circulation of said electric energy;

step 4 of recycling of the condensate, comprising:

using the condensate after vaporization as water used in the graphite purification process through fluid circulation; and step 5 of regularly discharging the vaporization residue, comprising:

regularly discharging the vaporization residue by a residue discharging device of the electric distiller, wherein the vaporization residues are formed by crystallization or precipitation and concentration of some ions in the neutralized supernatant after the neutralized supernatant is vaporized and concentrated.

2. The processing method for graphite acid purification wastewater according to claim 1, wherein the electric distiller is connected with an external solar power generation system which serves as the supplement for the electric energy recycled in the step 3.

3. The processing method for graphite acid purification wastewater according to claim 1, wherein in the step 1, one or more of calcium carbonate, quicklime, lime and/or lime slurry is used as the alkaline neutralizer.

4. The processing method for graphite acid purification wastewater according to claim 1, wherein in the step 1, the method for concentration and sedimentation is selected from natural sedimentation, high-efficiency thickener sedimentation or centrifugal sedimentation.

5. The processing method for graphite acid purification wastewater according to claim 1, wherein in the step 2, the exhaust pressure of the electric distiller for heating and vaporization is 0.6 MPa to 3.5 MPa, the vaporized steam passes through the power generation system of the steam turbine, and the exhaust pressure of the steam turbine is 0.11 MPa to 0.55 MPa.

6. The processing method for graphite acid purification wastewater according to claim 1, wherein in the step 3, the electric energy generated by the power generation system of the steam turbine firstly charges an energy storage and conversion system for later use.

7. The processing method for graphite acid purification wastewater according to claim 1, wherein in the step 4, the content of graphite acid purification impurities in the condensate is reduced to 0.1 mg/L to 5 mg/L, and the condensate is directly discharged to the outside;

wherein the graphite acid purification impurities comprise fluorine, chlorine, aluminum, silicon, iron, and magnesium.

8. The processing method for graphite acid purification wastewater according to claim 1, wherein in the step 5, the vaporization residue is periodically discharged at intervals between 1 and 6 hours, and for a period between 1 to 10 minutes at each interval.

* * * * *